J. C. KLEIN.
Fire-Poker.
No. 131,618.　　　　　　　　　　Patented Sep. 24, 1872.
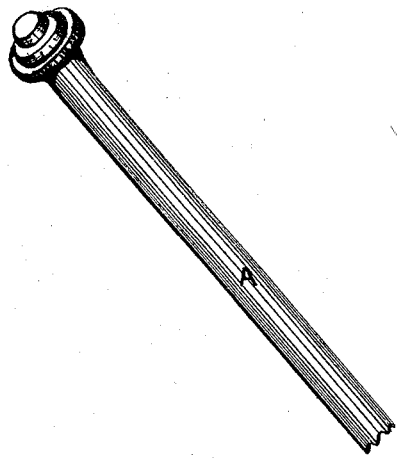
Fig: 1.
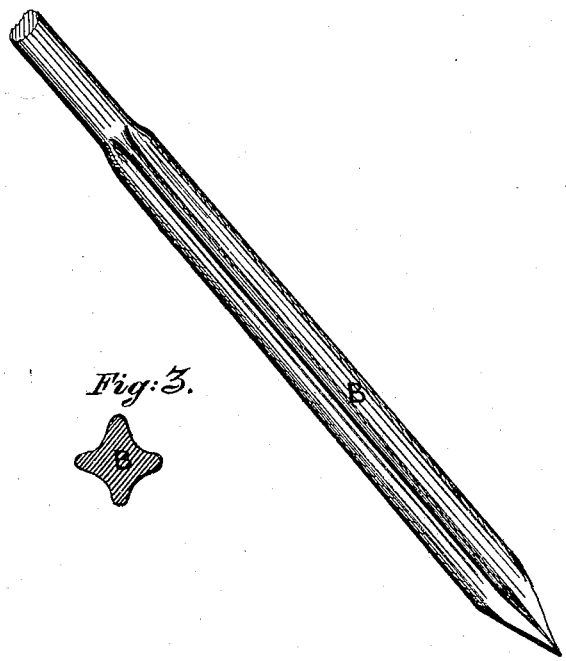
Fig: 2.　　Fig: 3.
WITNESSES
H. H. Young
F. H. Burr
John C. Klein
Inventor
By David A. Burr
Atty.

UNITED STATES PATENT OFFICE.

JOHN C. KLEIN, OF BIRMINGHAM, PENNSYLVANIA.

IMPROVEMENT IN FIRE-POKERS.

Specification forming part of Letters Patent No. 131,618, dated September 24, 1872; antedated September 20, 1872.

*To all whom it may concern:*

Be it known that I, JOHN C. KLEIN, of Birmingham, in the county of Huntington and State of Pennsylvania, have invented an Improved Fire-Poker, of which the following is a specification:

My invention relates to the manufacture of a fire-poker constructed of a round bar of iron having a square or angular end; and it consists in the formation of a square or angular-headed round bar in one entire piece without welding. Heretofore square-ended pokers have been manufactured by welding an angular piece upon the end of a round bar. The object of my invention is to avoid the expense of welding the two parts to constitute the poker, and consequently to reduce the cost thereof, as well as to furnish a better article.

In the accompanying drawing, Figure 1 is a view in perspective of my improved poker; Fig. 2 is a sectional view illustrating the compression of its angular end between dies constructed for the purpose; and Fig. 3, a section of the angular end of the finished poker.

In manufacturing this improved poker I take an ordinary bar, A, of round iron, cut to a suitable length, and after heating its end B to a suitable heat insert the same between dies or jaws C C, formed with an angular notch or groove to compress the round bar into the angular form, illustrated in Fig. 1. At the first insertion of the bar two of the angles are formed, and the metal extended somewhat in the direction of the remaining angles, which in turn are shaped by giving a quarter revolution to the bar, and then again compressing it between the dies or jaws. The end of the bar is thus reduced to an angular form at a very slight cost without impairing its strength, and I thus produce very cheaply a fire-poker of the most approved form in one solid unbroken piece.

I claim as my invention—

As a new article of manufacture, a wrought-iron fire-poker made in one entire piece, round in the shank and squared at the end, without extension, by compression between suitable dies, substantially as herein set forth.

JOHN CHR. KLEIN.

Witnesses:
  DAVID A. BURR,
  F. H. BURR.